(12) United States Patent
Lin

(10) Patent No.: US 6,568,806 B1
(45) Date of Patent: May 27, 2003

(54) SPECTACLE APPARATUS HAVING REPLACEABLE NOSE PAD

(75) Inventor: Kuo-Tseng Lin, Taipei (TW)

(73) Assignee: Gazelle Corporation, Taipei (TW)

( * ) Notice: Subject to any disclaimer, the term of this patent is extended or adjusted under 35 U.S.C. 154(b) by 0 days.

(21) Appl. No.: 10/170,459

(22) Filed: Jun. 14, 2002

(51) Int. Cl.[7] .................................................. G02C 5/12
(52) U.S. Cl. ......................... 351/138; 351/136; 351/80
(58) Field of Search ................................. 351/138, 137, 351/139, 136, 41, 44, 80, 65, 78, 79, 70

(56) References Cited

U.S. PATENT DOCUMENTS 5,737,055 A * 4/1998 Dittmeier .................... 351/138

* cited by examiner

*Primary Examiner*—Hung Xuan Dang
(74) *Attorney, Agent, or Firm*—Rosenberg, Klein & Lee

(57) ABSTRACT

The nose pad for a spectacle frame comprises a spectacle frame, being a industrial spectacle frame, locating a rabbet on the pivotal portion and a plurality of rack members to two opposed side of bridge wherein said rabbet locating said rack member above; a nose pad, softly, connected to said spectacle frame by said rabbet and said rack member and it including projecting element, being a barb, and two row elements which being coupled to rack members by a plurality of holes, said number of holes being equal to rack member.

4 Claims, 3 Drawing Sheets

SPECTACLE APPARATUS HAVING REPLACEABLE NOSE PAD

FIELD OF THE INVENTION

The present invention generally relates to a nose pad of spectacle frame, and more particularly, to the nose pad is a elastic member coupling to spectacle frame.

BACKGROUND OF THE INVENTION

According to different environment of jobs, eyes and head as well as face is forced in face of the different of dangerous, some of them need to specially protect such as solder must protect dust, impulsion and radiation at same time.

The product, you choose to protect yourself, must reach standard of CNS or manufacture of country standard or national standard, all of them must high or equal to standard of CNS for example. ANSI, EN, CAS and JIS. Further more, the protect of the ability is suitable whether your choice such as the protect of limited radiation used to general laser.

How about is the useful environment? Comfort? How long is the degree of long-lived? Is it Easy to maintain? Is it hard to scraping? Is it convenient? Is there a hardness and individual environment lens? Absolutely, that it select the industrial spectacle must suit workplace in order to avoid dangerous never just selecting fashion style.

The industrial spectacle used to protect the worker against the dangerous such as following:

1. To protect form the mechanical injuring (splash particle, splash chemical material)
2. To protect form the radiation injuring(laser, visible light, ultraviolet rays, infrared rays)

Basically, the spectacle making comfort is a branch of learning. Frankly speaking, there is suitable material, weight spectacle and used a nose pad to match form of the nose according to size of the nose, slope of the degree making slide of the spectacle. And, with wrong design, the spectacle is leaving a trace of the nose pad.

There are lots of the ability of the industrial spectacle as following:

1. It is feel comfort.
2. It is easy wearing and hard broken.
3. It is difficult the members off the spectacle.
4. There are not any sharp portion of the elements of the spectacle.
5. The structure of the spectacle must be changeable.

BRIEF DESCRIPTION OF THE INVENTION

The appended claims particularly point out and distinctly claim the subject matter of this invention. The various objects, advantages and novel features of this invention will be more fully apparent from a reading of the following detailed description in conjunction with the accompanying drawings in which like reference numerals refers to like parts, and in which:

SUMMARY OF THE INVENTION

Therefore it is an object of the invention to provide a nose pad which is comfortable to wear.

In accordance with one aspect of this invention, there is provided a nose pad for industrial spectacle including a spectacle frame, being a industrial spectacle frame, locating a rabbet on the pivotal portion and a plurality of rack members to two opposed side of bridge wherein said rabbet locating said rack member above; and a nose pad, softly, connected to said spectacle frame by said rabbet and said rack member and it including projecting element, being a barb, and two row elements which being coupled to rack members by a plurality of holes, said number of holes being equal to rack member.

DETAILED DESCRIPTION OF THE PREFERRED EMBODIMENT

Figure 1:
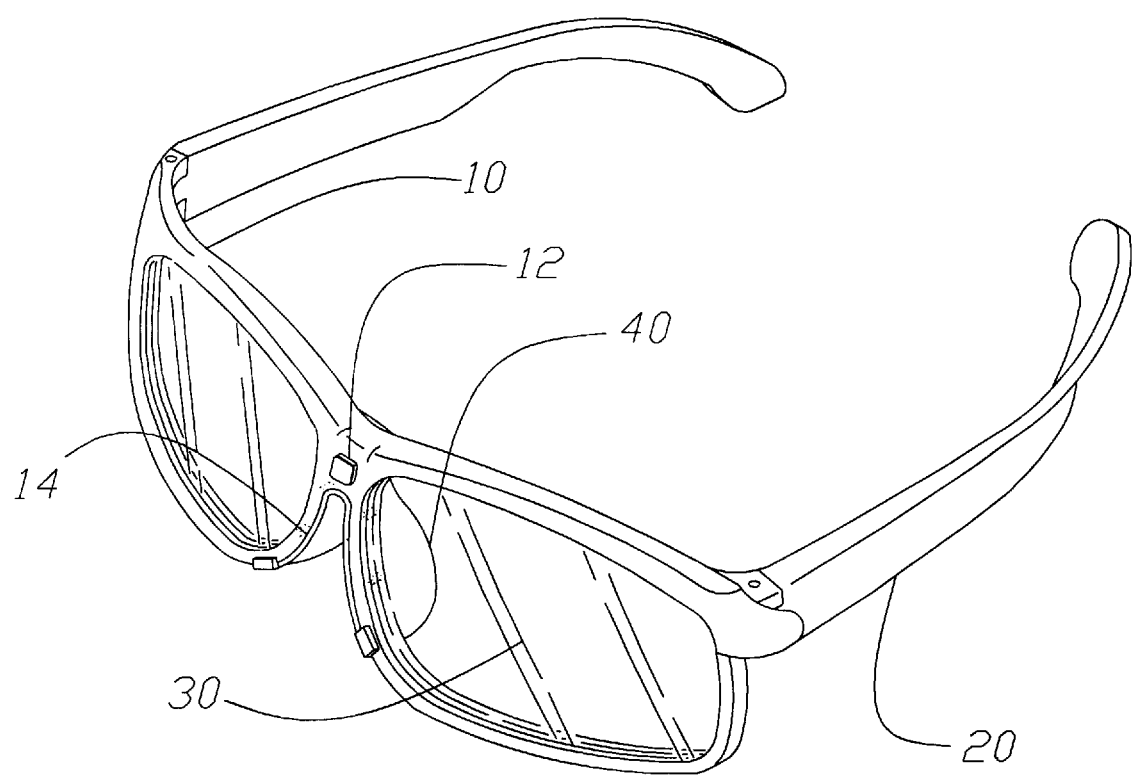
FIG. 1 is a pictorial drawing and a side view showing of the present invention.

Referring to FIG. 1, which is a pictorial drawing and a side view showing of the present invention. The industrial spectacle comprises a spectacle frame 10, a frame temple 20, a lens 30 and a nose pad 40 wherein the spectacle frame, being a industrial spectacle frame, locating a rabbet 12 on the pivotal portion and a plurality of rack members 14 to two opposed side of bridge wherein the rabbet 12 locating the rack member 14 above.

Figure 2:
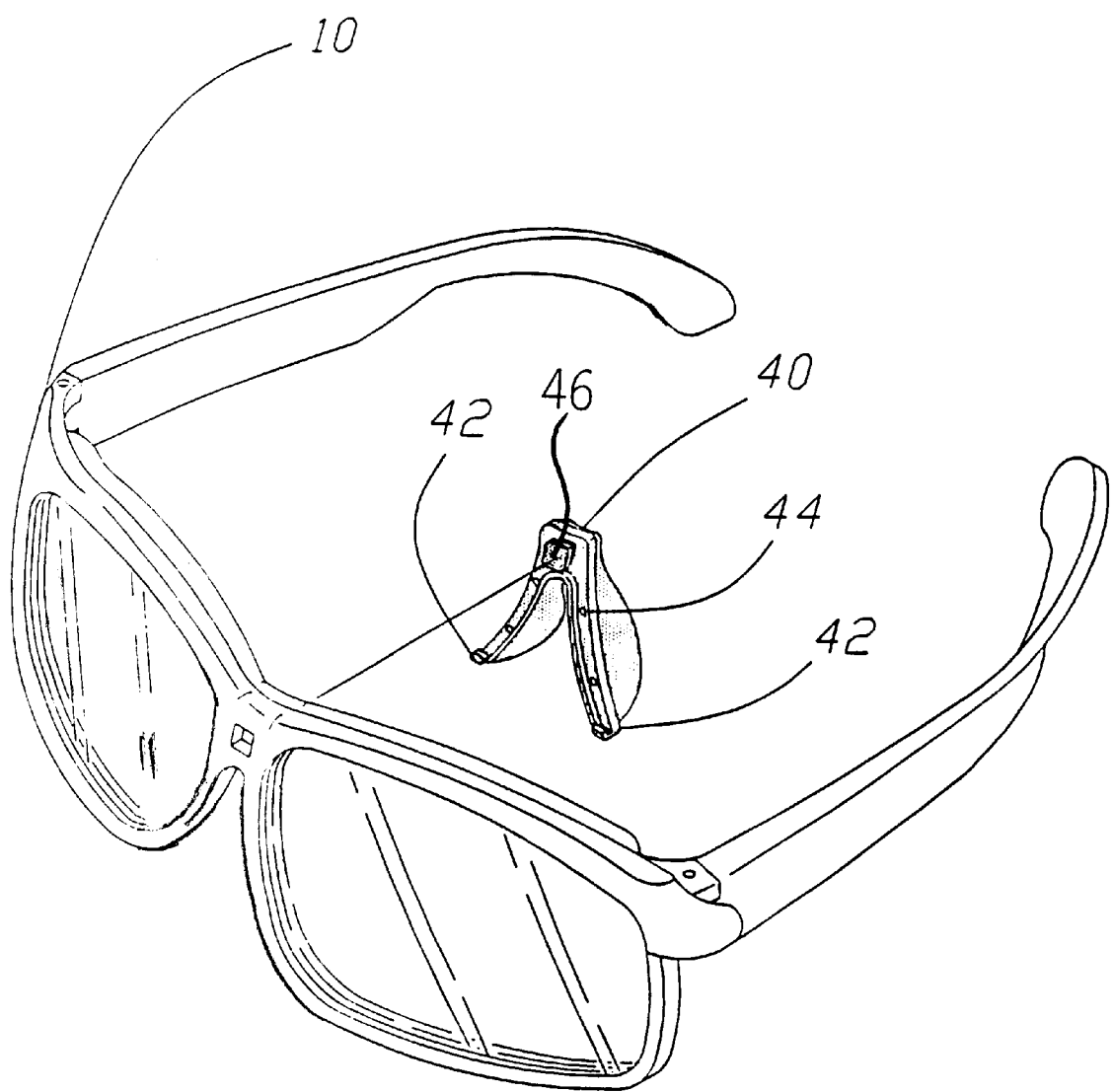
FIG. 2 is a pictorial drawing showing according to nose pad of the present invention.
Figures 3A, 3B:
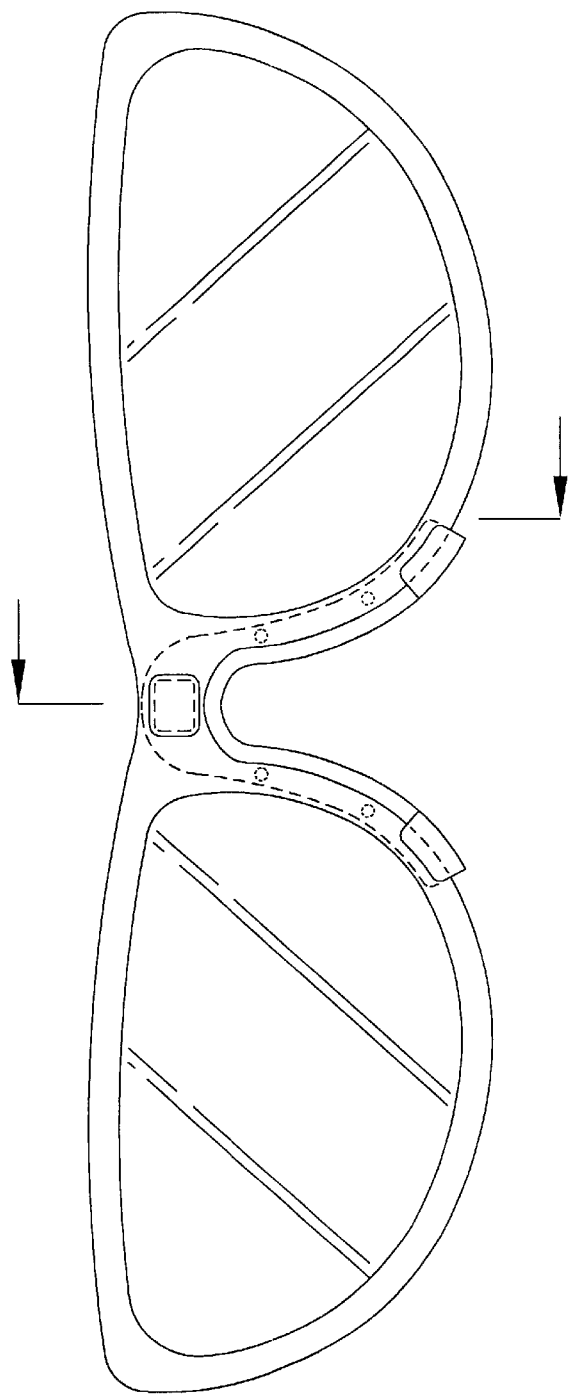
FIGS. 3A and 3B are a side view showing according to nose pad of the present invention.

Referring to FIGS. 2 and 3A and 3B, which is a pictorial drawing and a side view showing according to nose pad of the present invention. The nose pad 40, softly, connected to said spectacle frame 10 by the rabbet 12 and the rack member 14 and it including projecting element 46, being a barb, and two row elements 42 which being coupled to rack members 14 by a plurality of holes 44, said number of holes 44 being equal to rack member 14. The nose pad is made of a elastic material and is manufactured by one-shot mode. That the projecting element is a barb used to prevent the nose pad form off and the projecting element is pressed by lens to prevent the nose from off.

While the making and using of various embodiments of the present invention are discussed in detail below, it should be appreciated that the present invention provides many applicable invention concepts which can be embodied in a wide variety of specific contexts. The specific embodiments discussed herein are merely illustrative of specific ways to make and use the invention and do not delimit the scope of the invention.

What is claimed is:

1. A spectacle apparatus having a replaceable nose pad comprising:

(a) a spectacle frame having a bridge portion, said bridge portion defining a pair of rack members extending in spaced manner one from the other, said bridge portion having a rabbet opening formed therein above said rack members; and, (b) a nose pad detachably coupled to said bridge portion of said spectacle frame, said nose pad being integrally formed of a resilient material;

said nose pad including a pair of row elements each receiving at least a portion of one said rack member in substantially conformed manner, each said row element having formed therein at least one fastening hole;

said nose pad further including at least one projecting element formed to extend transversely therefrom, said projecting element having a barb configuration for retentively engaging said bridge portion.

2. The spectacle apparatus as recited in claim 1 wherein said nose pad is integrally formed of an elastic material.

3. The spectacle apparatus as recited in claim 1 wherein said projecting element retentively engages said rabbet of said spectacle frame bridge portion.

4. The spectacle apparatus as recited in claim 1 wherein said row elements of said nose pad each include a flanged portion projecting transversely therefrom to engage a portion of said spectacle frame bridge portion.

* * * * *